Patented Mar. 3, 1931

1,795,125

UNITED STATES PATENT OFFICE

KARL HEUSNER AND MAX SIMON, OF LEVERKUSEN, NEAR COLOGNE-ON-THE-RHINE, GERMANY, ASSIGNORS TO GENERAL ANILINE WORKS, INC., OF NEW YORK, N. Y., A CORPORATION OF DELAWARE

PROCESS OF PRODUCING AZO DYESTUFFS

No Drawing.   Application filed March 26, 1926.   Serial No. 97,759.

The present invention relates to the new compounds of the general formula:

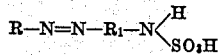

wherein R represents the residue of any diazo compound and $R_1$ a benzene nucleus, which may be substituted.

These compounds are obtainable, for instance, by coupling any diazo compound with a sulfaminic acid of the benzene series such as the sulfaminic acid of aniline, a toluidine or a cresidine. They are, when dried and pulverized, generally reddish to brownish powders dying wool in yellow to orange shades. This reaction usually proceeds very uniformly producing the dyestuffs with excellent yields and eliminating the formation of undesirable by- or decomposition products. This is particularly valuable if it is desired to obtain the corresponding dyestuffs with the free amino group, as we have further found that the sulfo group of the sulfaminic acid can be easily eliminated, as for instance by boiling the sulfaminic azo compound in aqueous solution with dilute mineral acids. By this procedure better yields and more uniform products are obtained than when coupling the free amino compound directly with the respective diazo compound. The dyestuffs are generally reddish to brownish powders which dye wool in yellow to orange shades.

Similar compounds are obtainable by coupling a diazo compound with a sulfaminic acid of the naphthalene series, for example with 1-naphthyl-sulfaminic-7-sulfonic acid, 2-naphthyl-sulfaminic acid or 2-naphthyl-sulfaminic-6-sulfonic acid. These compounds are more fully described and claimed in our U. S. Patents 1,690,783, patented November 6, 1928, and 1,725,076 patented August 20, 1929.

The following example will further illustrate our invention, the parts being by weight:

15 parts acetyl-p-phenylenediamine are diazotized in the usual way and coupled at 0° C. with an aqueous solution containing 28 parts soda ash and 23.9 parts of the sodium salt of 2-sulfamino-4-methyl-1-methoxy benzene of the formula

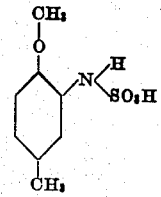

The dyestuff is isolated in the usual way; it has most likely the formula

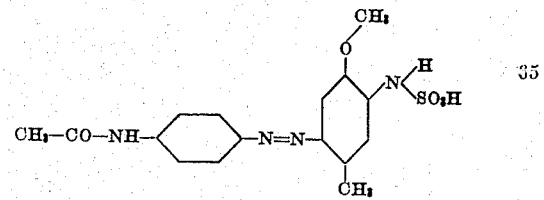

The dyestuff, when dried and pulverized, is a brownish powder dyeing wool in yellow shades. By treatment with dilute mineral acid the sulfo group is split off.

We claim:

1. As new products the compounds of the general formula:

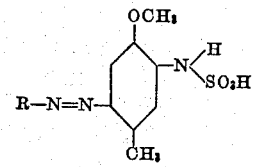

wherein R represents the residue of any diazo compound, which dyestuffs are, when dried and pulverized, generally reddish to brownish powders dyeing wool in yellow to orange shades.

2. As a new product, the monoazo dyestuff having most probably the formula:

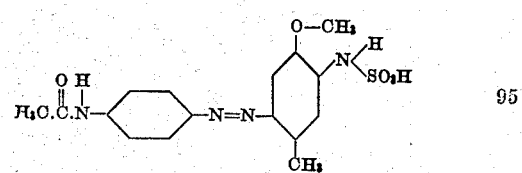

being, when dried and pulverized, a brownish powder dyeing wool in yellow shades.

3. As new products, the compounds of the general formula:
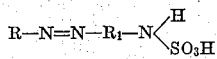
wherein R represents the residue of any diazo compound and $R_1$ a benzene nucleus, which may be substituted.
In testimony whereof we have hereunto set our hands.
KARL HEUSNER.
MAX SIMON.